June 25, 1968     J. R. OISHEI ET AL     3,389,419
WINDSHIELD WIPER
Filed Aug. 27, 1965     3 Sheets-Sheet 1

INVENTORS.
JOHN R. OISHEI and
FREDERICK R. WEYMOUTH JR.
BY
E. Herbert Liss
ATTORNEY.

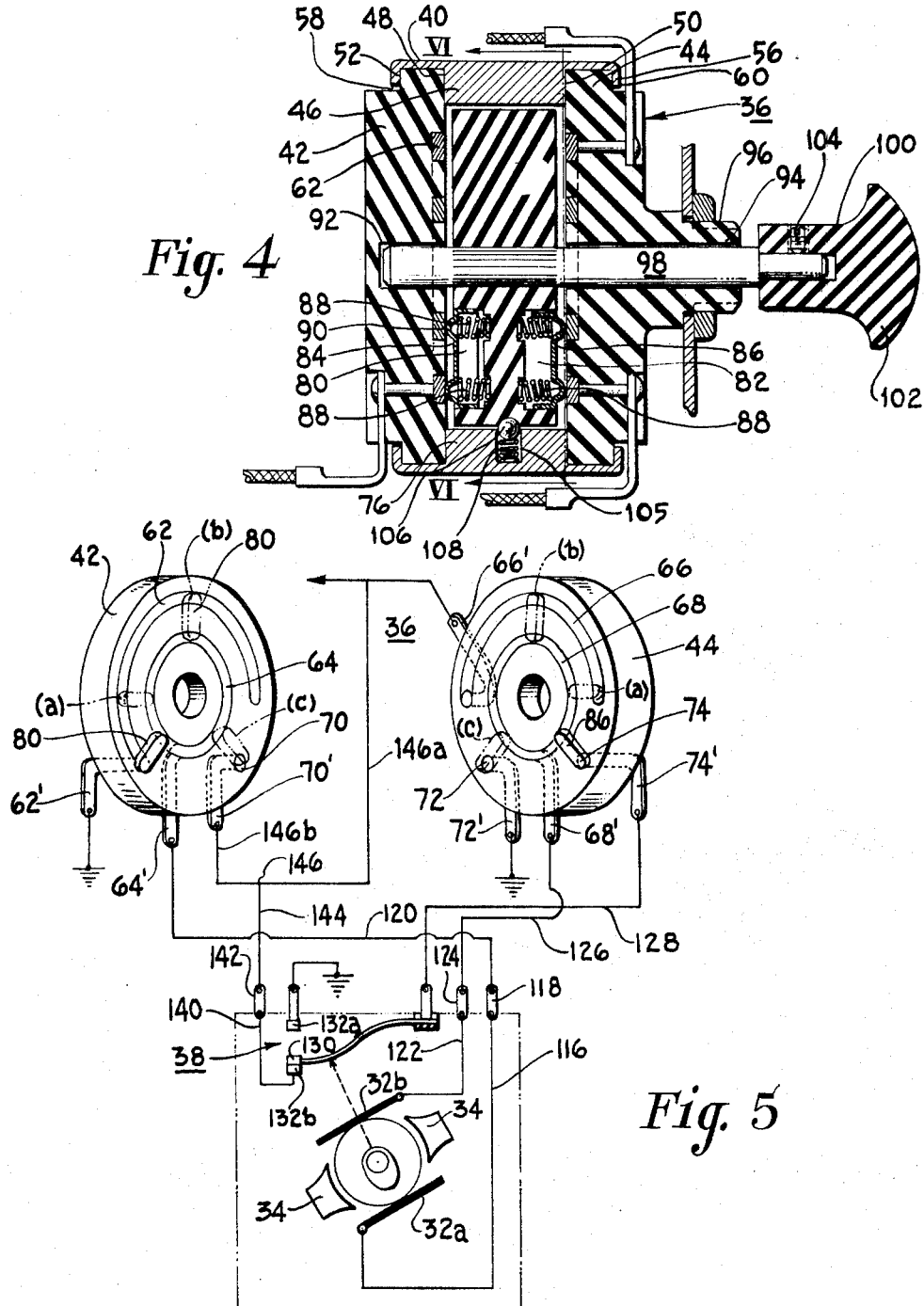

June 25, 1968

J. R. OISHEI ET AL 3,389,419

WINDSHIELD WIPER

Filed Aug. 27, 1965

INVENTORS.
JOHN R. OISHEI and
BY FREDERICK R. WEYMOUTH JR.

ATTORNEY.

United States Patent Office

3,389,419
Patented June 25, 1968

3,389,419
WINDSHIELD WIPER
John R. Oishei and Frederick R. Weymouth, Jr., Buffalo, N.Y., assignors to Trico Products Corporation
Filed Aug. 27, 1965, Ser. No. 483,040
6 Claims. (Cl. 15—250.12)

ABSTRACT OF THE DISCLOSURE

A clutch transmits rotary motion from a rotating motor output to oscillating motion in a pair of windshield wiper arms when the motor is rotated in one direction and intermittent oscillating with a dwell period at the end of each cycle when the motor is rotated in the opposite direction. During intermittent dwell operation, a cam associated with a Geneva wheel maintains the clutch disengaged during dwell periods. The Geneva wheel indexes the cam in response to motor rotation. A manual control switch having a park position, a continuous run position and an intermittent dwell position is provided; it includes an elongated contact between the park position and the intermittent dwell position to assure operation of at least one cycle in the continuous run position prior to switching to intermittent dwell.

---

This invention relates to windshield wipers and, more particularly, to windshield wipers of the intermittent dwell type wherein a period of rest is provided between cycles of wiper operation. Conventionally, windshield wipers cycle continuously to and fro in an arcuate path at a predetermined frequency; in some instances the frequency of wiper cycling may be varied by the operator or one of a plurality of frequencies may be selected. Under certain road and weather conditions this type of operation causes smearing of the windshield and undue wear on the wiper blades. Furthermore, the monotony of continuous operation causes driver fatigue.

Recently, intermittent dwell type wipers have been developed which provide a dwell period between cycles of wiper operation. This improved type wiper assembly eliminates the windshield smear often encountered under so-called wet-dry conditions by utilizing the car created wind stream to dissipate the film of moisture between wiper cycling. The intermittent action eliminates the monotony induced by continuous wiper cycling and prolongs the life of the rubber element by reducing the number of wiper strokes required.

Various types of intermittent dwell wiper mechanisms are being developed including, inter alia, thermally actuated bimetallic switching devices responsive to current flow and mechanical indexing devices for controlling clutch engagement in a wiper transmission. An example of such a mechanical indexing device is a Geneva gear mechanism in which the clutch between the input shaft and the output shaft of the transmission is moved into engagement by a clutch control member associated with the Geneva gear in at least one position of the motor driven Geneva wheel. In such mechanisms, if the wiper is actuated to a parked state during the initial portion of the dwell period, then the next time the wiper is restarted, the Geneva mechanism will continue to cycle through the remainder of the dwell period until it reaches a clutch-engaged wiper cycling position. Thus it is likely that when the wiper is started by the vehicle operator, no wiper movement will occur for a substantial duration of time. Lack of wiper movement upon operator actuation of the control switch results not only in a dangerous condition due to accumulation of moisture on the windshield and lack of adequate visibility, but also results in distraction to the driver due to the psychological impact attendant to turning a switch and obtaining no results. Thus the operator never knows whether a failure has occurred in the wiper mechanism or whether the wiper is in a dwell period. Driver control of windshield wiping is seriously impaired. It is imperative to provide control means which will at all times provide immediate response upon operator movement of the actuating knob. In an intermittent system it is essential that movement of the control results in blade movement.

It is also desirable that parking of the wiper blades in a suitable parked position out of the viewing range takes place automatically upon actuation of the operator control to parked position. In certain newly developed mechanical indexing mechanisms for intermittent dwell wipers, parking in the proper position is accomplished from the continuous operating position by first turning the control actuator into intermittent position, then waiting for a dwell period and finally deenergizing the wiper motor. From the intermittent position it is necessary to wait for a dwell period and then turn off the wiper motor in order to obtain parking of the blades in the proper position.

Therefore, the principal object of the present invention is to provide an improved intermittent dwell windshield wiper system utilizing mechanical indexing means for obtaining rest periods between cycles of wiper operation wherein energization of the wiper system produces immediate blade movement.

Another object of the present invention is to provide an improved intermittent dwell windshield wiper system utilizing mechanical indexing means for obtaining rest periods between wiper cycling wherein actuation of the operator controlled actuator results in instantaneous blade movement and wherein actuation to parked position from a run position results in power parking in the correct blade parked position.

A further object of the present invention is to provide an improved intermittent dwell windshield wiper system utilizing a mechanical indexing means for obtaining rest periods between periods of wiper cycling and which provides continuous wiper operation by operator selection wherein the actuator is maintained in continuous operating position for a duration of time sufficient to obtain blade movement prior to movement to intermittent dwell position.

Other objects and advantages of the invention will be apparent from the following detailed description taken in connection with the accompanying drawings in which:

FIG. 4 is a sectional view of the control switch taken on line IV—IV of FIG. 6;

FIG. 5 is a schematic diagram of the electrical circuitry utilized in this invention.

Figure 1:
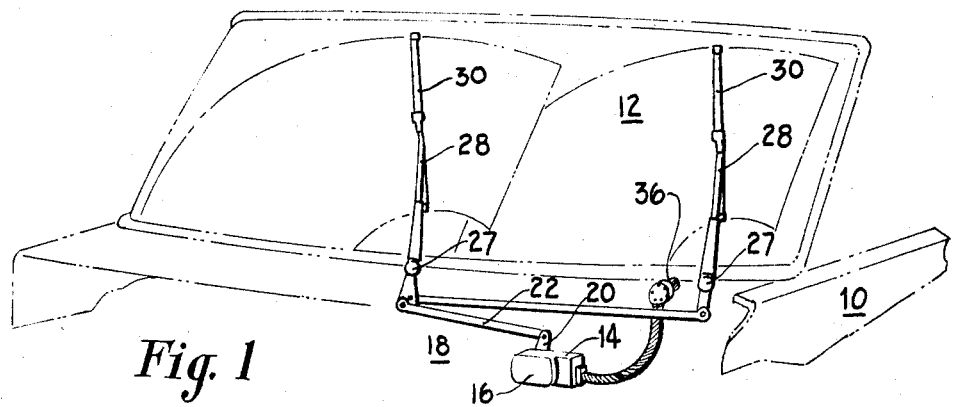
FIG. 1 is a partial perspective view of an automotive vehicle incorporating the invention.

Briefly, the invention comprises a control system for windshield wiping apparatus which includes a gear box having a gear train therein for driving a wiper linkage transmission. As illustrated herein by way of example, a driving gear is rotatably mounted within the gear box and adapted to be driven by the motor output shaft. The output shaft of the transmission has a driving wheel mounted thereon including an embossment on its inner periphery forming a clutch element adapted to be engaged by one or the other of a pair of movable clutch shoes which are mounted on the output gear of the transmission. A Geneva wheel is mounted on a stub shaft having its axis parallel to the axis of the output shaft of the transmission. The Geneva wheel is disposed in a position wherein it meshes with a stud on the output gear of the transmission to effect indexing of the Geneva wheel in response to continuous rotary motion of the motor output shaft. The Geneva wheel includes lobes which have portions thereof adapted to engage one of the pair of movable clutch shoes when the motor is operating in a first direction to bias that clutch shoe out of engagement with a mating portion of the embossment on the inner periphery of the driving wheel on the output shaft. As illustrated, one lobe on the Geneva wheel is cut back to permit outward pivotal movement of a clutch shoe to thereby permit engagement of the clutch shoe on the output gear of the transmission with the embossment or clutch element on the driving wheel of the output shaft. Thus, once in every complete rotation of the Geneva wheel, the output shaft is engaged with the input of the transmission so that wiper cycling results. When the output gear is rotating in the opposite direction due to the reversal of the motor, the other of the pair of movable clutch shoes on the output gear of the transmission is maintained in continuous engagement with a mating portion of the embossment on the driving wheel of the output shaft to provide continuous rotation of the output shaft for continuous wiper cycling. The latter clutch shoe has an under cut portion to prevent engagement with the engaging lobes of the Geneva wheel, when the motor is operating in a first direction for intermittent dwell operation, the second mentioned of the clutch shoes on the driving wheel is so designed as to be cam biased out of engagement with the embossment on the driving wheel of the output shaft.

A control switch or control actuator designed for manual operation is provided for energizing the motor and includes a parked position, a continuous run position and an intermittent dwell position and includes a detent for maintaining the switch in each position. The switch, if desired, may be operated in a continuing clockwise direction to move from intermittent dwell to park position or a stop may be included, requiring the switch to be turned in a reverse or counterclockwise direction through continuous run to parked position. It should also be understood that in accordance with the broader aspects of the invention, a push pull switch may be employed instead of a rotary switch. The contacts for the continuous run position are elongated to provide a longer continuous run position than either park or intermittent dwell positions. In a rotary switch this may be as much as 180 degrees of turn or greater, if desired. A cam actuated parking switch is disclosed which bypasses the manually operated control switch except when the assembly is in parked position to thereby maintain wiper cycling until the wiper blades are in correct parked position when the manual switch is opened.

In FIG. 1 an automotive vehicle 10 is shown having a windshield 12 mounted thereon in a conventional manner. A windshield wiper motor 14 having a gear reduction assembly 16 is mounted on the fire wall 18 of the vehicle. The gear reduction assembly has a crankarm 20 operatively coupled thereto and drives a wiper transmission linkage assembly 22 for oscillating rockshafts 27 which are journaled in the cowl of the vehicle. The rockshafts 27 have wiper arms 28 mounted at their outer ends. The wiper arms each carry wipers 30. When the wiper motor 14 is energized, the wipers 30 will be oscillated across the windshield to clear moisture therefrom.

The circuit for energizing the wiper motor is shown in FIG. 5. A reversible motor of the permanent magnet type is shown by way of illustration and includes an armature 32 and poles 34. A rotary reversing switch 36 is illustrated for manually energizing the motor. A cam actuated parking switch 38 is also provided which bypasses the rotary switch except when the wiper blades are positioned in the correct parking position adjacent the lower molding of the windshield. The parking switch is cam actuated between the bypassing circuit and ground.

Figure 6:
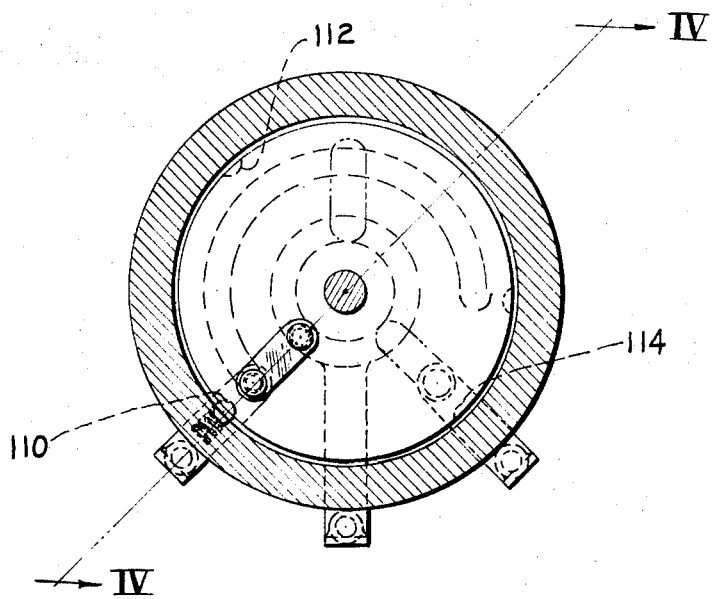
FIG. 6 is a sectional view taken on line VI—VI of FIG. 4.

The rotary reversing switch 36 (FIG. 4) includes a hollow cylindrical housing 40 closed at its ends by insulating discs 42 and 44 of insulating material. The housing 40 has an internal annular boss 46 disposed substantially centrally intermediate its ends providing shoulders 48 and 50 which form stops for insulating discs 42 and 44, respectively. The discs 42 and 44 include shoulders 52 and 56 for receiving annular inturned flanges 58 and 60. The discs are retained in position between the shoulders 52 and 56 and the annular flanges 58 and 60. An arcuate contact strip 62 is embedded on the inner surface of the insulating disc 42. An annular contact strip 64 is embedded on the inner surface of the disc 42 concentric with the strip 62 and spaced radially inwardly therefrom. On the disc 44 there is embedded on the inner surface in opposition to the contact strip 62 an arcuate contact strip 66. Concentric therewith and spaced radially inwardly therefrom is an annular contact strip 68. Also embedded in the insulating disc 42 is a contact 70 disposed on the arc defined by the contact strip 62, but spaced circumferentially therefrom. Disposed similarly, but in opposition to the contact 70, there is embedded in the disc 44 a contact 72. Also embedded in the disc 44 is a second contact 74 which is disposed on the arc defined by the contact strip 66, but spaced circumferentically therefrom adjacent the end of the contact strip 66 remote from the contact 72. Terminals 62', 64', 66', 68', 70', 72' and 74' are provided for the contact strips and contacts 62, 64, 66, 68, 70, 72 and 74, respectively. The housing 40, together with the discs 42 and 44 and their respective contacts and contact strips form the stator 76 of the switch 36. The rotor 78 of the switch 36 comprises an insulating disc having radial recesses 80 and 82 on opposite sides thereof in back to back relationship. Disposed within the recesses 80 and 82, respectively, are contacts 84 and 86, respectively, which are spring biased outwardly by springs 88. The contacts 84 and 86 are of a radial length sufficient to extent between the arc defined by the contact strips 62 and 66 and the arc defined by the contact strips 64 and 68. The disc of rotor 78 is disposed within the housing 40 in a position whereby projections 90 on the contact strips 84 and 86 engage the contacts and contact strips on the stator 76. The disc 42 includes a centrally disposed bearing recess 92 and the disc 44 includes an opening 94 forming a bearing through a centrally disposed hub portion 96 on the outer surface thereof. In alignment with the recess 92 and the opening 94 is a central opening through the disc or rotor 78 of the switch. A rod 98 is journaled in the recess 82 of the opening 94. The rod is received in the central opening of the disc 78 for rotation therewith by a splined fit or other suitable rigid securing means. The rod 98 has a reduced end portion 100 extending outwardly of the opening 94 to which is secured an actuator knob 102 by a set screw 104 or other suitable means. Formed in the annular boss 46 of the housing 40 is a radial recess 105. Disposed in the recess 105 is a spring biased ball detent comprising a ball 106 and a spring 108. The detent ball 106 is adapted to engage notches 110, 112 and 114 on the periphery of the disc 78 as best seen in FIG. 6. The contact strip 62 extends through an arc which may be greater than 180 degrees. When the detent ball 106 is received in the notch 110, contact 84 engages contact strip 62 and contact 86 engages contact 74. This defines the parking position or parking state of the switch 36. The contact strip 66 on the disc 44 extends through an arc of approximately 180 degrees and is disposed so that the contacts 84 and 86 engage the contact strips 62 and 66 at approximately the center of their arcs when the notch 114 engages the detent ball 106. This defines the continuous run position or state of the switch 36. It should be observed that when the knob 102 is turned clockwise from the solid line positon to the dotted line position a illustrated in FIG. 5, the continuous position or state is reached at the instant when the contact 86 engages the end of the contact strip 66 and continues in continuous run position to the detent position b and through the detent until the contacts 84 and 86 leave the contact strips 62 and 66 and engage the contacts 70 and 72, respectively, in dotted line position c, FIG. 5. This occurs when the detent ball 106 is received in the detent notch 112. This latter position defines the intermittent run position or state of the switch. In order to return to tthe parking position, in accordance with the broader aspects of this invention, the switch may be rotated either counterclockwise back through the continuous run position or rotation in a clockwise direction may be continued until the parking detent is again engaged.

When the switch 36 is in parked position, the armature 32 is connected through brush 32a, lead 116, terminal 118, lead 120, terminal 64′, contact strip 64, contact 80, contact strip 62 and terminal strip 62′ to ground. The armature 32 is connected through brush 32b, lead 122, terminal 124, lead 126, terminal 68′, contact strip 68, contactor 86, terminal 74, terminal strip 64′, lead 128, movable contact 130 of parking switch 38 and stationary contact 132a of parking switch 38 to ground. Parking switch 38 is cam actuated by a cam operated switch and a cam mounted on the rotor. When the blades are in parked position, contacts 130 and 132a are closed to ground, resulting in dynamic braking of the motor. When the blades are not in their correctly parked position, the cam on the driving wheel of the gear reduction box effects closing of contacts 130 and 132b of parking switch 38. In this case the circuit through brush 32b travels through contacts 130 and 132b of parking switch 38, lead 140, terminal 142, lead 144 and junction 146 through lead 146a to the battery terminal thus causing the motor to operate until the wiper blades reach the correct parking position adjacent the lower molding of the windshield.

When the switch is positioned in a continuous run state, current travels from the battery through terminal 66′, contact strip 66, contactor 86,, position b, contact strip 68, terminal 68′, lead 126, terminal strip 124, lead 122, brush 32b, armature 32, brush 32a, lead 116, terminal 118, lead 120, terminal 64′, contact strip 64, contactor 80, position b, contact strip 62, terminal 62′ to ground. This results in counterclockwise motor rotation.

When the switch is in intermittent dwell position or state, the contactors 80 and 86 are in position c and current flows from the battery through lead 146a, junction 146, lead 146b, terminal 70′, contact 70, contactor 80, contact strip 64, terminal 64′, lead 120, terminal 118, lead 116, brush 32a, armature 32, brush 32b, lead 122, terminal 124, lead 126, terminal 68′, contact strip 68, contactor 86, contact 72, terminal 72′ to ground. This causes clockwise rotation of the motor.

A gear box 16 is provided adapted to receive its input through spur gear 148 mounted on the motor output shaft. The gear box 16 includes a housing 150 having journaled therein for rotation an output shaft 29, a protruding end of which is operatively secured to crankarm 20 of linkage 22. Secured to the output shaft 29 for rotation therewith, as by a splined fit as shown, or integral therewith, or by any other suitable and desirable means, is a flanged driving ring 152 which has on the inner diameter of the flange a boss forming a clutch element 154. The clutch element 154 has a clutch engaging surface 156 at one end and a clutch engaging surface 158 at its other end. Journaled for rotation on the output shaft 29 is an output gear 160 having a center hub 162. Pivotally mounted at circumferentially spaced locations on the output gear 160 are a pair of clutch elements 164 and 164 for engagement with clutch surfaces 156 and 158, respectively. The clutch elements 164 and 166 are spring biased outwardly by a spring 168 which at each end engages one of the free ends of the clutch elements 164 and 166. When the output gear 160 is rotated in a clockwise direction, as viewed in FIG. 2, the clutch element 166 is cammed past the boss 154 and is not effective to cause engagement of output gear 160 with driving ring 152, but clutch element 164 engages clutch surface 154 to cause rotation of output shaft 29. When output gear 160 rotates in a counterclockwise direction, clutch element 164 is cammed past boss 154 and is ineffective to effect rotation of output shaft 29. However, in this direction of rotation, clutch element 166 engages clutch surface 158 to effect rotation of output shaft 29. The clutch element 164 is undercut as at 170 for a purpose to be explained hereinafter. A stub shaft 172 is provided having an axis parallel to the axis of the output shaft 29. Journaled on the stud shaft 172 is a Geneva wheel or Maltese cross type mechanism 174 which includes a control portion 176 on the upper surface thereof and an indexing portion 178 on the lower surface. The control portion 176 includes on each lobe thereof except one an abutment which engages the clutch element 166 as it approaches the embossed clutch element 154 on the driving ring 152 and depresses the clutch element 166 to preclude engagement with the surface 158 on the embossed clutch element 154. In one position the abutting portion is cut back so as to permit the clutch element 166 to engage the mating surface 158 to thereby drive the output shaft. A stud 180 is provided on the output gear 160 which engages in slots 182 between the lobes of the Geneva wheel 174 and indexes the Geneva wheel one position for each revolution of the output gear. Thus, as shown in the drawings, when the output gear 160 is rotating in a counterclockwise direction, once in every six revolutions of the output gear 160 the clutch 166 engages the mating surface 158 to produce a rotation of the output shaft 29 thereby providing a single wipe cycle and five cycles of dwell. It will of course be understood that any of the abutting surfaces 176 may be cut back as shown at 175 to provide more frequent wipe cycles or fewer dwell periods between wiping cycles. The clutch element 164 is undercut at 170 so that when the driving gear 160 is rotating in a clockwise direction, the abutting surfaces 176 of the Geneva gear mechanism do not engage clutch element 164 and it will be in continuous engagement with the mating surface 156 of the embossment or clutch element 154, thereby providing a continuous rotational output at shaft 29 to thus provide continuous wiper operation.

Figure 2:
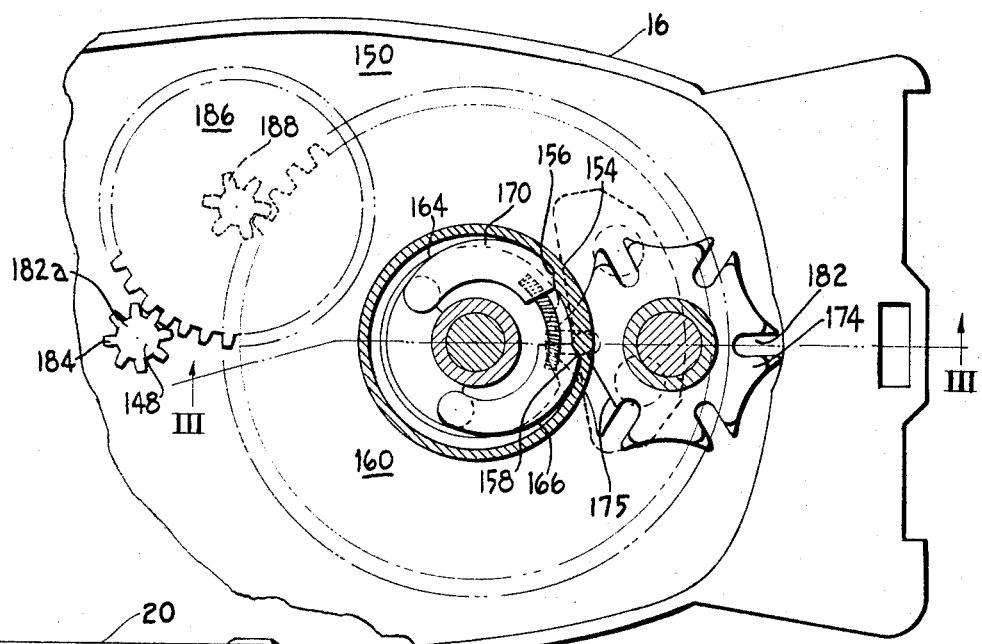
FIG. 2 is a sectional view of the gear box utilized in this invention taken on line II—II of FIG. 3.
Figure 3:
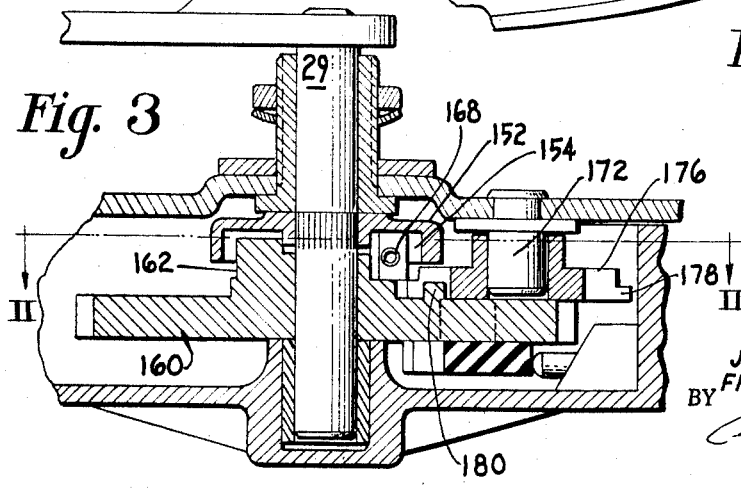
FIG. 3 is a sectional view of the gear box of this invention taken on line III—III of FIG. 2.

The gear box 16 is mounted on the motor housing with the motor output shaft 182a extending into the gear box. The portion of the motor output shaft 182a which extends into the gear box 16 has formed thereon a spur gear 184. Although a spur gear is shown, it will of course be understood that any suitable gear may be employed as, for example, a worm gear. The spur gear 184 meshes with an idler gear 186 mounted within the gear box. Idler gear 186 has formed thereon a pinion 188 which meshes with output gear 160 of the gear train. The stud 180 of output gear 160 in turn meshes with Geneva wheel 174 in slots 182 thereof, thus indexing the Geneva wheel one position for each revolution of the motor. Thus, clockwise rotation of the motor as viewed in FIG. 2 results in clockwise rotation of the output gear 160, causing clutch shoe 164 to engage mating clutch surface 156, resulting in continuous motor operation. If the motor is reversed and rotated in a counterclockwise direction, as seen in FIG. 2, clutch shoe 166 engages mating surface 158 and results in intermittent wiper operation wherein output is transmitted to the output shaft 29 once during each revolution of the Geneva gear or once for each position of the Geneva gear which includes a cut back engaging surface 175.

The operation of the wiper assembly of this invention should now be apparent. When the knob 102 is turned clockwise from the parked position, it engages the contact strip 62 causing clockwise rotation of the motor and continuous operation of the wiper system. The knob may be turned clockwise on the contact strip through an elongated arc which may be as great as 180 degrees and thereby maintained in continuous running position. A detent may be positioned at the mid point of the arc formed by the contact strip 162 to provide a positive continuous run position. When the switch is rotated further clockwise out of the detent position *b* to the detent position *c*, or an intermittent run position, the motor is reversed and runs counterclockwise, causing intermittent operation of the wiper system. A stop may be provided, not shown, for preventing the knob from being rotated clockwise further from the intermittent position to the parked position or such a stop may be omitted permitting continuous clockwise rotation, thereby avoiding return of the switch through continuous operation to reach the parked state or parked position. It will be seen that by utilization of this novel control construction the operator is required to maintain the switch in continuous run position when moving from parked to intermittent position for a sufficient length of time to provide wiper movement which may be at least one cycle or more. The detent *b* introduces a further delay and provides further positive assurance of wiper movement upon operation of the control. It can be seen that but for this unique switch if the Geneva wheel had reached its first dwell position, there would be a period of five revolutions of the output gear 160 before the wiper would begin to operate if the control knob were rapidly moved from parked position to intermittent dwell position. Thus a positive delay in the continuous position is introduced by this unique construction.

It should now be apparent that an intermittent dwell windshield mechanism has been provided for assuring initial operation upon turning of the control which effects at least a cycle of wiper operation prior to a dwell period. A certain specific embodiment of the invention has been shown and described for the purpose of illustration, but it will be apparent that various modifications and other embodiments are possible within the scope of the invention. As, for example, in lieu of an elongated continuous run position, a heavy detent may be employed for introducing a delay and in another embodiment a control switch of a push pull type rather than a rotary type with an elongated continuous run position may be provided. Thus it will be apparent that various modifications and other embodiments are possible within the scope of the invention. It is to be understood, therefore, that the invention is not limited to the specific arrangement shown, but in its broadest aspects it includes all equivalent embodiments and modifications which come within the scope of the invention.

What is claimed is:

1. A windshield wiper for providing intermittent dwell periods between cycles of wiper operation comprising a motor, mechanical transmission means including clutch means for controlling the output of said mechanical transmission, a cyclic clutch actuating mechanism, indexing means for moving said cyclic clutch actuating mechanism from one position to the next for each cycle of motor rotation, means on said cyclic clutch actuating mechanism for effecting clutch engagement in at least one position thereof, control means including a wiper parking position for interrupting motor operation, a continuous run position for effecting continuous clutch engagement and an intermittent dwell position for effecting cyclic clutch engagement, said control means operating in circuitous sequence from parking position to continuous run position to intermittent dwell position and means for effecting a time lag between movement from continuous run position to intermittent dwell position when moving from parked position.

2. A windshield wiper for providing intermittent dwell periods between cycles of wiper operation comprising a motor, mechanical transmission means including clutch means for controlling the output of said mechanical transmission, a cyclic clutch actuating mechanism, indexing means for moving said cyclic clutch actuating mechanism from one position to the next for each cycle of motor rotation, means on said cyclic clutch actuating mechanism for effecting clutch engagement in at least one position thereof, control means including a wiper parking position for interrupting motor operation, a continuous run position for effecting continuous clutch engagement and an intermittent dwell position for effecting cyclic clutch engagement, said control means operating in circuitous sequence from parking position to continuous run position to intermittent dwell position, means for effecting a time lag between movement from continuous run position to intermittent dwell position when moving from parked position and parking means for power parking said windshield wiper when said control means is moved from a run position to parked position.

3. A windshield wiper assembly for providing dwell periods between cycles of wiper operation comprising a rotary motor, mechanical transmission means adapted to be driven by the output of a rotary motor for converting continuous rotary motion to intermittent rotary motion, clutch means for controlling engagement between said transmission input shaft and said transmission output shaft, indexing means for effecting cyclic intermittent engagement of said clutch means, means for rendering ineffective said indexing means to provide continuous engagement of said clutch means, and control means for switching said assembly from a parked state to a state of continuous operation thence to a state of intermittent operation, said control means including delay means for effecting the prolonging of the state of continuous operation when switching from said parked state to said state of intermittent operation whereby an initial cycle of wiper operation is assured upon energizing said wiper assembly.

4. A windshield wiper assembly for providing dwell periods between cycles of wiper operation comprising a rotary motor, mechanical transmission means adapted to be driven by the output of a rotary motor for converting continuous rotary motion to intermittent rotary motion, clutch means for controlling engagement between said transmission input shaft and said transmission output shaft, indexing means for effecting cyclic intermittent engagement of said clutch means, means for rendering ineffective said indexing means to provide continuous engagement of said clutch means, control means for switching said assembly from a parked state to a state of continuous operation thence to a state of intermittent operation, said control means including delay means for effecting the prolonging of the state of continuous operation when switching from said parked state to said state of intermittent operation and means to power park said wiper assembly whereby an initial cycle of wiper operation is assured upon energizing said wiper assembly and a return of the assembly to parked position is assured upon deenergizing said wiper assembly.

5. A windshield wiper assembly for providing dwell periods between cycles of wiper operation comprising a mechanical means adapted to be driven by the output of a rotary motor for converting continuous rotary motion to intermittent rotary motion, clutch means for controlling engagement between said transmission input shaft and said transmission output shaft, a Geneva gear mechanism driven by a continuously revolving member, said Geneva gear mechanism including clutch control means for effecting disengagement of said clutch means in at least one position thereof to cause cyclic intermittent rotary output, means for rendering ineffective said clutch control means to provide continuous engagement of said clutch means to cause a continuous rotary output, and manually operated control means for switching from parked position to continuous operation to cyclic intermittent operation in sequence, said manually operated control means including means for providing a delay in continuous operation position of sufficient duration to assure wiper movement prior to initiation of a dwell period.

6. A windshield wiper assembly for providing dwell period between cycles of wiper operation comprising a mechanical means adapted to be driven by the output of a rotary motor for converting continuous rotary motion to intermittent rotary motion, clutch means for controlling engagement between said transmission input shaft and said transmission output shaft, a Geneva gear mechanism driven by a continuously revolving member, said Geneva gear mechanism including clutch control means for effecting disengagement of said clutch means in at least one position thereof to cause cyclic intermittent rotary output, means for rendering ineffective said clutch control means to provide continuous engagement of said clutch means to cause a continuous rotary output, manually operated control means for switching from parked position to continuous operation to cyclic intermittent operation in sequence, said manually operated control means including means for providing a delay in continuous operation position of sufficient duration to assure wiper movement prior to initiation of a dwell period and means for delaying parking of said wiper assembly when switching from a run position to parking until the wiper assembly reaches parked position.

References Cited

UNITED STATES PATENTS

| | | | |
|---|---|---|---|
| 2,364,603 | 12/1944 | Coxon et al. | 15—250.17 |
| 2,987,747 | 6/1961 | Oishei et al. | 15—250.12 XR |
| 3,145,407 | 8/1964 | Page et al. | 15—250.12 |
| 3,241,390 | 3/1966 | Kirchner | 15—250.12 XR |

CHARLES A. WILLMUTH, *Primary Examiner.*